(12) United States Patent
Giordan et al.

(10) Patent No.: US 10,513,945 B2
(45) Date of Patent: Dec. 24, 2019

(54) INSTRUMENTED FLOW PASSAGE OF A TURBINE ENGINE

(71) Applicant: Safran Aircraft Engines PI (AJI), Paris (FR)

(72) Inventors: Jeremy Giordan, Moissy-Cramayel (FR); Florian Joseph Bernard Kockenpo, Moissy Cramayel (FR); Stephane Rousselin, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 787 days.

(21) Appl. No.: 15/237,211

(22) Filed: Aug. 15, 2016

(65) Prior Publication Data

US 2017/0159484 A1    Jun. 8, 2017

(30) Foreign Application Priority Data

Aug. 21, 2015    (FR) ..................................... 15 57856

(51) Int. Cl.
*F01D 17/02*    (2006.01)
*F01D 5/26*    (2006.01)
*G01P 5/165*    (2006.01)

(52) U.S. Cl.
CPC ............... *F01D 17/02* (2013.01); *F01D 5/26* (2013.01); *G01P 5/165* (2013.01); *F05D 2260/12* (2013.01); *F05D 2260/80* (2013.01); *F05D 2260/83* (2013.01); *F05D 2260/961* (2013.01); *Y02T 50/671* (2013.01); *Y02T 50/673* (2013.01)

(58) Field of Classification Search
None
See application file for complete search history.

(56) References Cited

U.S. PATENT DOCUMENTS

| 5,185,996 A | * | 2/1993 | Smith | ..................... F01D 17/02 |
| | | | | 374/144 |
| 6,776,524 B2 | * | 8/2004 | Park | ......................... G01K 7/02 |
| | | | | 374/148 |
| 2012/0107116 A1 | * | 5/2012 | Obrecht | ................ F03D 7/0296 |
| | | | | 416/1 |

FOREIGN PATENT DOCUMENTS

| EP | 1 892 377 A1 | 2/2008 |
| FR | 1024218 A | 3/1953 |
| JP | S59-187132 A | 10/1984 |

* cited by examiner

*Primary Examiner* — David E Sosnowski
*Assistant Examiner* — Juan G Flores
(74) *Attorney, Agent, or Firm* — Blank Rome LLP

(57) ABSTRACT

An annular air flow passage includes two radially internal and external annular walls. An element is elongated in a direction between the internal and external annular walls and a first of the internal or external ends of the element is fixed rigidly to a first of the internal or external walls. The center of gravity position of the element is variable.

6 Claims, 3 Drawing Sheets

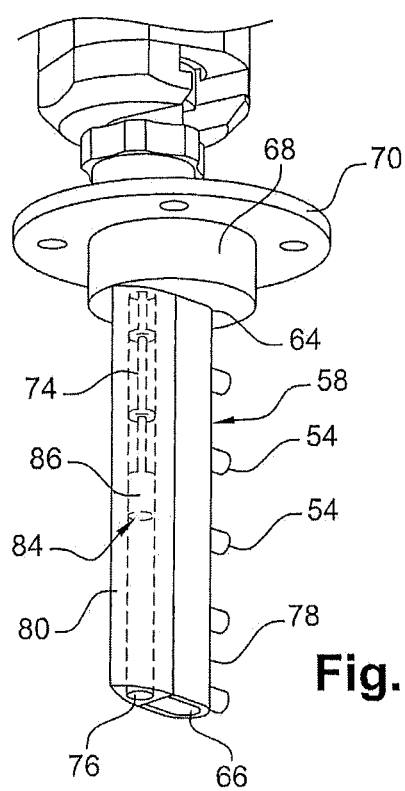
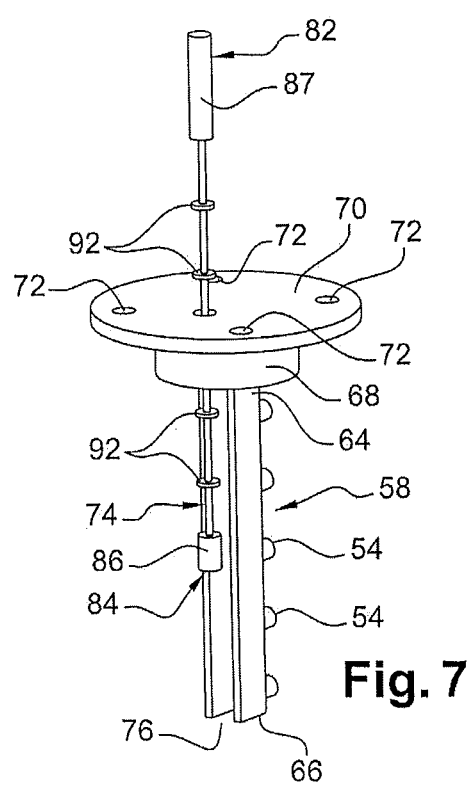
Fig. 6  Fig. 7
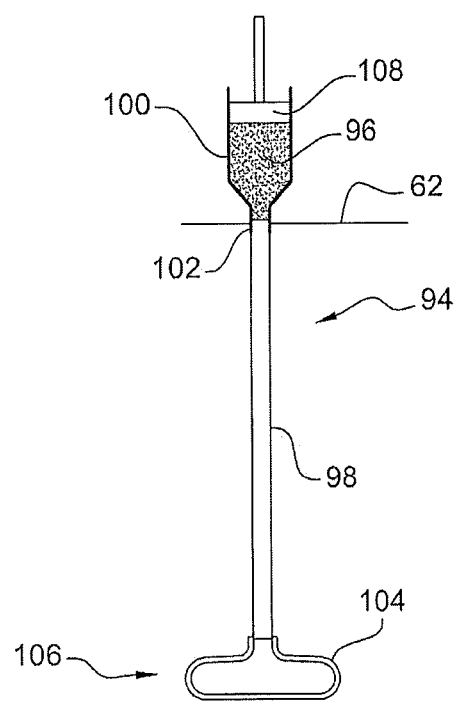
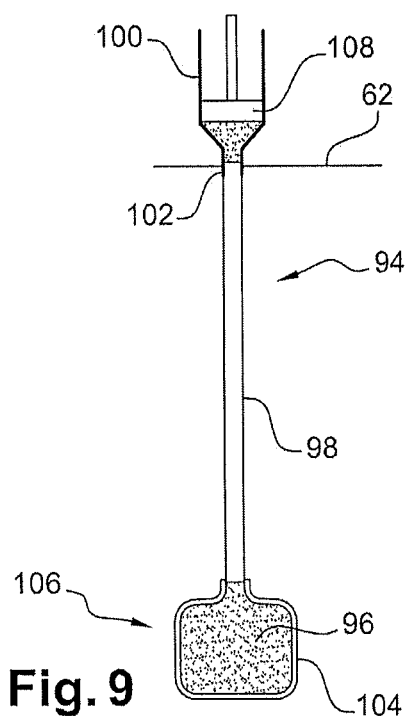
Fig. 8  Fig. 9

INSTRUMENTED FLOW PASSAGE OF A TURBINE ENGINE

BACKGROUND OF THE INVENTION

1. Field of the Invention:

The present invention concerns an annular air flow passage, particularly for a turbine engine, such as a turbofan or turboprop, comprising an elongated element passing through the flow passage and capable of being instrumented.

2. Description of the Related Art:

Conventionally, a dual-flow turbofan 10, as illustrated in FIG. 1, consists of a gas turbine 12 with a revolution axis 14 driving a ducted fan wheel 16, wherein the latter is generally positioned upstream from the turbofan. The mass of air sucked in by the engine is divided into a primary air flow (arrow A) that flows through the gas turbine 12 or engine core and a secondary air flow (arrow B) originating from the fan 16 and surrounding the engine core, wherein the primary and secondary air flows are concentric and circulate in a primary annular flow passage 18 and a secondary annular flow passage 20 respectively 8.

In a manner well known per se, the primary air flow (arrow A) is generally compressed by a low-pressure compressor 22 and subsequently by a high-pressure compressor 24, each having vanes both fixed 26 and mobile arranged alternatively in the direction of movement of the flow. The low-pressure compressor shaft connected to the fan wheel 4 is driven in rotation by the shaft of a low-pressure turbine arranged downstream (not illustrated). The low-pressure compressor shaft is driven in rotation by the shaft of a high-pressure turbine arranged at the outlet of a combustion chamber and located upstream from the low-pressure turbine (both not illustrated).

In a double-body turbofan of this kind, fan casing usually designates the external annular wall 28 surrounding the fan wheel 16 and intermediate casing 30 designates a structural element of the turbine engine interposed axially between the compressors, low-pressure 22 and high-pressure 24, which passes through the annular flow passages, primary 18 and secondary 20. This intermediate casing 30 comprises two annular walls, radially internal 32 and external 34, respectively delimiting, internally and externally, the primary annular air flow passage 18 and two annular walls, radially internal 36 and external 38 delimiting internally and externally the secondary annular flow passage 20, respectively.

Within the context of developing a turbofan, the latter's performances need to be tested with a view to its certification. Development turbine engines are therefore provided for this purpose. A large number of measurements are performed on these turbofans. The characteristics of the aerodynamic flow in particular are measured at specific axial positions or measurement planes 40a, 40b, 40c.

For this purpose, elongated bodies 42a, 42b and 42c, commonly known as measurement sensors, arranged on the measurement planes 40a, 40b, 40c, are generally used to characterise the aerodynamic flow by measuring parameters such as pressure and temperature for example during operation. Such an element, 42a, 42b, 42c, comprises a first radially external end 44 and a second end 46, radially internal in relation to the axis of rotation. As shown in FIG. 2, the first end 44 of the element 42a comprises a base 48 fixed by bolting to the fan casing 28. The base 48 is thus fixed rigidly in all directions to the wall 28.

The elongated element may extend appreciably in a radial direction like bodies 42a or 42b, which are arranged in the secondary air flow and are rigidly fixed by their radially external end or like element 42c, which extends appreciably perpendicularly from the internal wall 32 internally delimiting the primary air flow passage.

The second end 46 of the element opposite the first end 44 fixed to the turbine engine is generally free, i.e. with degrees of freedom in the axial, radial and circumferential directions.

These bodies 42a, 42b, 42c, are termed intrusive, since immersed in the primary or secondary air flow. The measuring element 42a comprises a tubular body 50 with an external aerodynamic shape liable to affect as little as possible passage of a flow of air. The body 50 comprises an upstream surface 52 provided with holes distributed along the direction of elongation of the body 50. In the embodiment shown in FIG. 2, a cylindrical nozzle 54 is installed in each hole so as to protrude in the upstream direction in relation to the upstream surface 52. Each nozzle 54 is equipped with means of measurement of characteristics of a flow, such as temperature or pressure for example.

Owing to their intrusive nature in the aerodynamic flow passages of the engine, a study of the vibration behavior of the instrumented elements is performed systematically during the design phase. It is therefore important to limit resonance phenomena of the element liable to cause cracks in the measuring element capable of affecting its mechanical integrity. In extreme cases, formation of nicks or cracks as a result of the vibrations may cause partial or total dislocation of the element 42a, 42b, 42c. The debris thus released circulates in the flow passage and may damage components of the turbine engine arranged downstream. It is clear that the damage caused by such dislocation may be particularly severe when a measuring element 42a, 42b, 42c is installed in the primary flow passage, since the debris pay damage the combustion chamber and the fixed and rotating components of the high-pressure and low-pressure turbines.

This resonance phenomenon of the element may be due to several sources of vibratory stimuli within the turbine engine. A first source of vibration results for example from the residual imbalance of the rotating assemblies, i.e. of the low-pressure and high-pressure rotors. A second source of vibration originates from the alternation of the compression and decompression phases due to rotation of a row of mobile blades. This second source of vibration proves particularly intense when the measuring element is arranged immediately downstream from an impeller as is the case with the element 42a in FIG. 1.

By way of an example, a fan wheel, comprising 30 blades, revolving at a rotation speed of 2000 rpm, generates a pulsation of 1000 Hz. If the first normal mode of the measuring element is close to 1000 Hz, the element will have a high risk of resonating in this case.

A measuring element has a natural frequency that is fixed and depends on its structural and dimensional characteristics. When the vibration frequency of the element $f_1$ comes close to its resonance frequency $fr_1$, there is a high risk of resonance, which increases the risk of crack formation.

In order to minimize resonance phenomena, the engine operating ranges should be limited in this case to ranges in which the vibration frequency $f_1$ is sufficiently distanced from the resonance frequency $fr_1$. In other words, some ranges of operating speeds of the turbofan may be prohibited in the presence of the measuring element, thereby reducing the value of the engine trials. Stoppage of the test turbine engine may therefore be necessary in order to change the element, which results in an increase in costs.

SUMMARY OF THE INVENTION

The aim of the invention is in particular to provide a simple, effective and economical solution to the problems of the previously described prior art.

To this end, it proposes an annular air flow passage, particularly for a turbine engine, comprising two radially internal and external annular walls, wherein an element is elongated in a direction between the internal and external annular walls and a first of the internal or external ends of the element is fixed rigidly to a first of the internal or external walls, characterised in that said annular flow passage comprises means of variation, along said direction, of the position of the element's center of gravity.

The invention thus proposes addition of means of variation of the center of gravity to an elongated element extending inside an annular flow passage. These means of variation are linked to means of control that govern the means of variation. Hence, when the elongated element comprising means of instrumentation is subjected to vibrations close to its resonance frequency, it is possible, via the means of variation of the center of gravity position, to modify the elongated element's natural frequency in order to distance the latter from the vibration frequency during operation.

According to another characteristic of the invention, the means of variation of the center of gravity position comprise means of movement of a mass along said direction of elongation.

Indeed, given its elongation in one direction, this element may at first sight be likened to a beam, one of the ends of which is embedded and the other end of which is free. Consequently, the Euler-Bernoulli beam theory may be applied, which stipulates that the natural frequencies $fr_i$ of the element adopt the form:

$$fr_i = \frac{\alpha_i^2}{2\pi L^2}\sqrt{\frac{K}{M}} \qquad (1)$$

where $\alpha_i$, expressed in meters, is a coefficient that depends on the mode order and the conditions of anchoring the element on the casing, whereby i is a natural number denoting the number of the normal mode considered for the calculation;

L, expressed in meters, is the center of gravity position of the element;

K, expressed in Newtons per meter, is the rigidity of the element;

and m, expressed in kg, is the mass of the element.

It is deduced from this relationship that moving the center of gravity cause a change in the natural frequencies of the element.

In a first embodiment, the element comprises at least one duct connecting a first tank to a second tank, wherein the first tank and the second tank are spaced apart from each other along said direction of elongation and the means of movement are able to move the mass that is liquid from the first tank to the second tank and vice versa.

The liquid is chosen so as to be suitable for the temperature and pressure conditions to which the element is subjected during operation. The liquid may be water when the element is arranged immediately downstream from a fan wheel or oil when the element is arranged in a low-pressure turbine.

According to an additional characteristic of the invention, the first tank may comprise a rigid jacket forming a body in which a piston is slidably installed for transferring the liquid between the first and second tanks.

Use of a slidably installed piston simplifies the liquid displacement device, generating a vacuum at the piston, to a mere movement of the piston.

The second tank may comprise a flexible jacket arranged at a second end of the internal and external ends opposite the first end.

Use of a flexible jacket allows the liquid to move and accompanies movement of the liquid. This jacket is manufactured from a material resistant to the conditions to which the element is subjected at the position of the measurement plane. This jacket may for example be made of elastomer.

In a second practical embodiment of the invention, the means of movement may comprise a rod mounted movably in translation, according to the direction of elongation, in a cavity of the element, wherein this rod bears the mass, the latter being in solid form.

Use of a rod mounted movably in translation allows an increase in precision of control of the natural frequencies by shifting the center of gravity of the element along the entire length of the element. The rod may be hollow or solid. This embodiment also proves easier to realise, since it does not require any connected tanks or duct with leaktightness that may be difficult to achieve.

According to another characteristic of this second practical embodiment, a first end of the ends of the movable rod passes through said first wall and is connected to means of measurement of the position of the mass along the element elongated in the cavity.

Use of means of measurement allows precise positioning of the mass inside the cavity, which permits precise modification of the resonance frequency.

According to another characteristic of the invention, said mass may be arranged on a second end of the rod opposite the first end.

Moving the mass modifies the natural frequencies of the rod. The latter may be positioned in the prolongation of the rod or be offset in relation to the end of the rod. The mass may be made from material different from or same as that of the rod.

The rod may also comprise weights spaced at intervals along the rod.

These weights serve to restrict formation of normal modes of the rod by increasing the overall rigidity of the rod. These weights may also be evenly spaced.

Preferably, the cumulative mass of the weights and that of the rod must not exceed 10% of the terminal mass located at the end of the rod.

According to another characteristic of the invention the second end of the elongated element opposite said first end is completely free, i.e. with degrees of freedom in the axial, radial and circumferential directions.

Control of the natural frequencies of the element is particularly important when the second end is completely free. Indeed, in this configuration, the element is highly sensitive to the effects of the vibrations.

It should be noted that the invention would also be applicable if the second end were only to have a single degree of freedom at the second end.

The invention also concerns a turbine engine comprising a flow passage as described above and an annular row of mobile blades driven in rotation by a rotor, wherein said row is arranged in the flow passage upstream from said elongated element.

In this configuration, during operation, the blades effect, through their rotations, a series of pulses, alternating compression and decompression, with the frequency of this series of pulses at the frequency f influencing the vibration frequency of the element $f_1$, which may then approximate the natural frequency $fr_1$ of the element, whereby the shift in the center of gravity thus advantageously allows modification of the resonance frequency $fr_1$ of the element.

The invention furthermore concerns a method for shifting the center of gravity of an element of an annular flow passage in a turbine engine comprising the stages involving:
 a) determining a first frequency $f_1$ corresponding to the vibration frequency of said element;
 b) determining a second frequency $fr_1$ corresponding to the first natural frequency of said element;
 c) calculating the absolute value $|f_1-fr_1|$;
 d) performing a comparison of $|f_1-fr_1|$ in relation to a first threshold consisting of establishing a risk of resonance if the absolute value of said difference is less than or equal to the first threshold;
 e) if a risk of resonance has been determined at the previous stage, shifting the center of gravity of the element along its direction of elongation in order to reduce the natural frequency of the element when $f_1>fr_1$ or increase the natural frequency of the element when $f_1<fr_1$.

The method according to the invention allows, using means of modification of the center of gravity position, modification of the natural frequency $fr_1$ of the element such that this frequency is sufficiently distanced from the vibration frequency $f_1$ depending on the element. It is thus possible to limit the risks of resonance of the element.

When there is insufficient difference between the frequencies $f_1$ and $fr_1$, two situations arise: the first, if $f_1>fr_1$ implies a situation in which the vibration frequency $f_1$ of the element is greater than its first natural frequency $fr_1$, the second if $f_1<fr_1$ implies a situation in which the vibration frequency $f_1$ of the element is greater than its natural frequency $fr_1$. Consequently, $fr_1$ needs to be moved apart from $f_1$, avoiding equality between these two values. This is achieved through a reduction in $fr_1$ when $f_1$ is higher and an increase in $fr_1$ when $f_1$ is lower.

Such a method makes it possible to control the natural frequencies $f_{r_i}$ of the element taking account of the excitation frequency $f_1$ of the element during operation.

BRIEF DESCRIPTION OF THE DRAWINGS

The invention will be better understood and other details, characteristics and advantages thereof will become apparent in reading the following description, given by way of a non-restrictive example with reference to the appended drawings in which:

FIGS. 6 and 7 are perspective and isolated diagrammatic views of the measuring element;

FIGS. 8 and 9 are diagrammatic representations of a second embodiment of the invention.

DETAILED DESCRIPTION OF THE PREFERRED EMBODIMENTS

Figure 1:
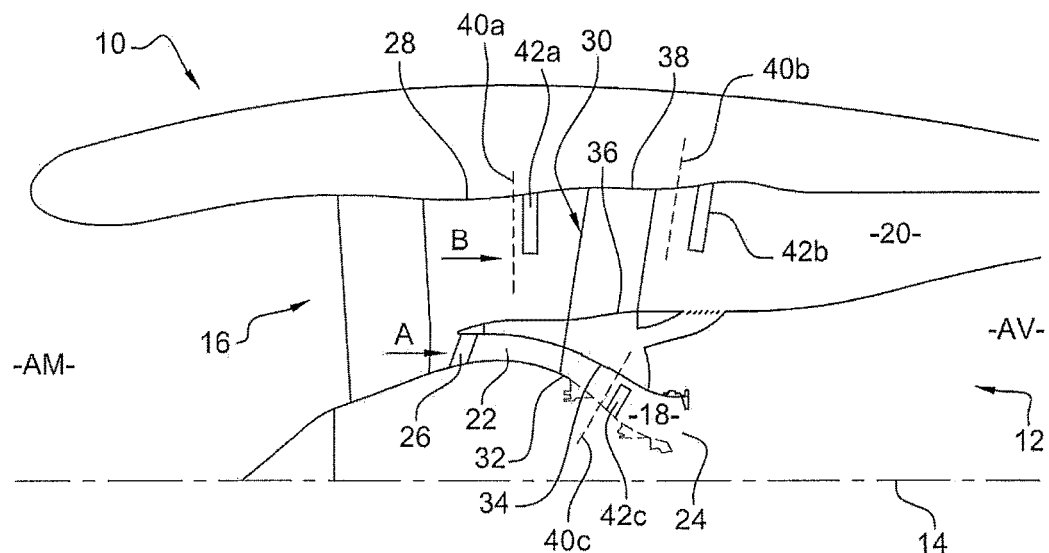
FIG. 1 already described is a cross-sectional axial diagrammatic half-view of an aircraft turbofan of a known type.
Figure 2:
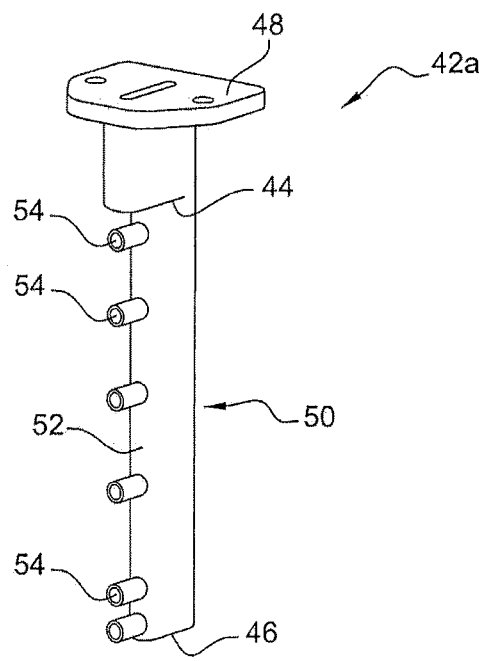
FIG. 2 already described is a perspective diagrammatic view of an element for measuring characteristics of a flow according to the known technology.
Figure 3:
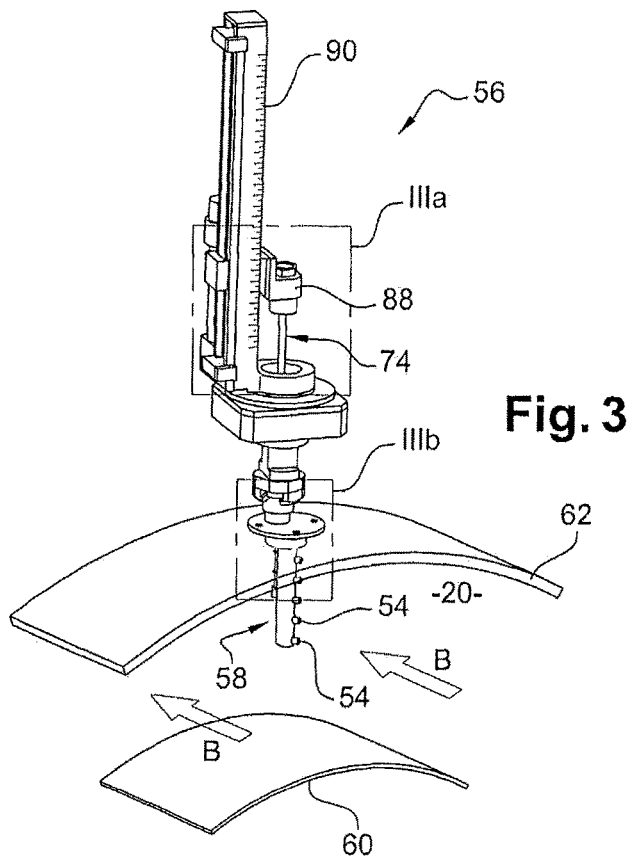
FIG. 3 is a perspective diagrammatic view of an element for measuring characteristics of a flow according to a first embodiment of the invention.
Figure 4:
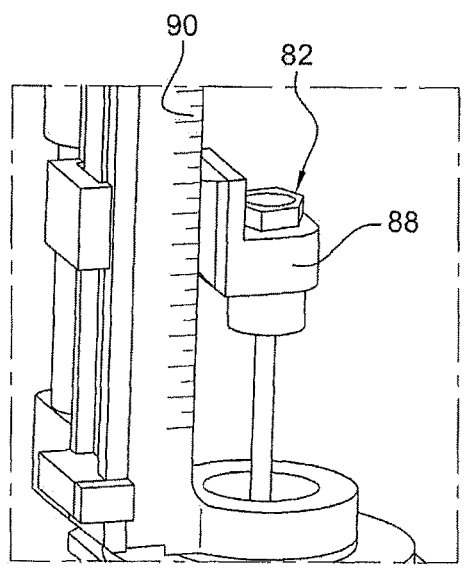
FIG. 4 is a larger scale view of the area IIIa of FIG. 3.

FIG. 3 represents a portion of a turbine engine annular flow passage such as an annular secondary air flow passage, comprising a measurement device 56 for measuring characteristics of the flow featuring a measuring element 58 extending in the air flow between internal 60 and external 62 revolution walls delimiting the air flow. FIGS. 4 to 7 show different views of the measuring element 58 and reference will be made to these figures in addition to FIG. 3 in that which follows.

Figure 5:
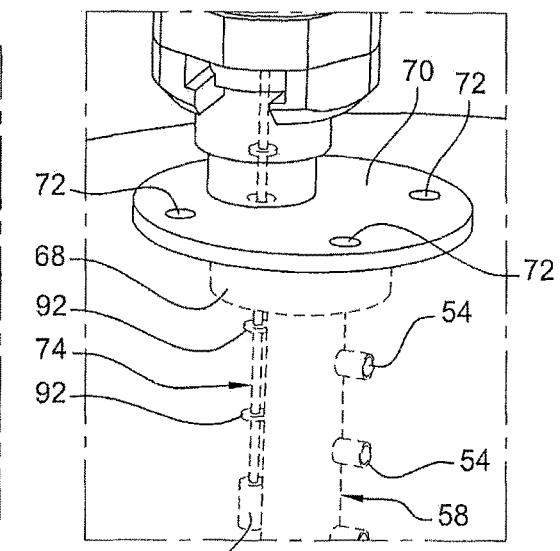
FIG. 5 is a larger scale view of the area IIIb of FIG. 3.

The measuring element 58 comprises a first radially external end 64 and a second end 66, radially internal. The radially external end is connected to a cylindrical portion 68 interdependent with a disc-shaped base 70 perforated by four holes 72 (FIGS. 5, 6 and 7). The measuring element 58 is inserted from outside the external wall 62 into an opening in the latter such that the cylindrical portion 68 and the disc engage in recesses of matching shape formed in the thickness of the external wall 62. Fixing screws are subsequently inserted into the holes 72 in the base 70 and into the holes opposite in the external wall 62. The first end 64 of the element is thus fixed rigidly in all directions to the external wall 62 (FIG. 5).

According to the invention, the measurement device for measuring the characteristics of a flow comprises means of variation of the center of gravity position of the element 58.

In the embodiments illustrated in the figures, these means comprise means of movement of a mass. Shifting the center of gravity of the element is favored by the movement of a mass arranged in the element.

In the first embodiment of the invention, the means of movement of a mass comprise a rod 74 mounted movably in translation in a cavity 76 of the element 58. The element 58 comprises a first upstream portion 78 comprising the holes for passage of nozzles 54 for measuring the characteristics of a flow, wherein these nozzles 54 comprise an opening oriented in the upstream direction and a downstream portion 80 accommodating the tubular-shaped cavity 76 in which the rod 74 is able to slide. It will be noted that the external surface of the downstream 78 and upstream 80 portions have an aerodynamic profile adapted to passage of an air flow so as to limit the impact of the measuring element 58 in the air flow.

The rod 74 comprises a first radially external end 82 and a second end 84, radially internal. The second end 84 bears a mass 86 which is an appreciably cylindrical-shaped solid. The first end 82 of the rod passes through the external wall 62 and comprises a cylindrical portion 87 of larger diameter serving as a gripping section on which a clip 88 is clamped. This clip 88 is connected interdependently to means of measurement comprising a graduated element 90. Movement of the rod 74 can be effected by a rack and pinion type system, for example.

According to the invention, moving the mass 88 allows a shift in the center of gravity of the element 58, thereby allowing modification of the natural frequency of the element 58.

Indeed, it is clear that the fixing method of the measuring element 58, with the first external end 64 fixed rigidly in all directions and the second end 66 devoid of any fixing in the three axial, radial and circumferential directions, resembles a single-embedded beam model and that shifting the center of gravity allows modification of the natural frequency of the element 58 (refer to equation 1 above).

Weights 92 are evenly spaced along the rod 74 between its first end 64 and its second end 66. The weights 92 make it possible to avoid appearance of normal modes of the rod 74. The weights 92 may for example be evenly spaced along the rod 74. The cumulative mass of the weights 92 and that of the rod 74 must preferably not exceed 10% of the mass of the mass located at the second end of the rod 74. This mass condition may mean that the rod 74 is internally hollow.

It is also noted that the portion 87 of larger diameter at the first end of the rod 74 never penetrates into the element 58 and remains outside the annular flow passage. This portion allows an increase in inertia of the rod 74 in movement.

During operation, when the resonance frequency of the element 58 is close to its vibration frequency, the mass 86 needs to be moved in order to modify the resonance frequency. Moving the mass 86 towards the second, not rigidly fixed end 66 of the element 58 results in a reduction in the first natural frequency (and in the natural frequencies of higher orders) of the element 58. Moving the mass 86 towards the first rigidly fixed end 64 of the element 58 results in an increase in the first natural frequency (and in the natural frequencies of higher orders) of the element 58 (refer to equation 1).

The mass 86 may be made from the same material as that of the rod 74 or from a different material.

FIGS. 8 and 9 illustrate a second embodiment of the invention in which the center of gravity of the element 94 is shifted by means of a liquid mass 96 movable between a first position (FIG. 8) and a second position (FIG. 9). To this end, the element 94 comprises at least one duct 98 providing a leaktight connection between a first external tank 100 arranged outside the external wall 62, at the first end 102 of the element 94 and a second tank 104 arranged at the second end 106 of the element 94.

The first tank 100 comprises a rigid jacket forming a body in which a piston 108 is slidably installed for transferring the liquid between the first 100 and second 104 tanks. The second tank 104 comprises a flexible jacket arranged at the second end 106 of the element 94.

Use of a slidably installed piston 108 simplifies the liquid displacement device, generating a vacuum at the piston 108, to a mere movement of the piston 108. The piston 108 may be movable among several positions so as to displace a given quantity of liquid between the first 100 and second 104 tanks.

The liquid is chosen so as to adapt itself to the temperature and pressure conditions at the position of the measurement plane. In this respect, it may consist of water at the level of the fan or oil at the level of the low-pressure turbine. The tank may have a capacity of 5 milliliters.

Other means of moving the liquid may be used, such as for example a pump, located outside the flow passage.

The flexible jacket of the second tank 104 may be manufactured from a material resistant to the temperature and pressure conditions at the position of the measurement plane, from elastomer for example.

During operation, movement of the piston 108 towards the first end 102 of the element 94 results in displacement of the volume of fluid from the first tank 100 (FIG. 8) towards the second tank 104 (FIG. 9). This has the effect of reducing the natural frequencies of the element 94. When it is a matter of increasing the natural frequencies, the piston 108 is moved in an opposite direction, as a result of which the liquid is sucked towards the first tank 100, with the second flexible tank 104 undergoing deformation.

Implementation of movement will be controlled by a system allowing comparison of the vibration frequency $f_1$ with the resonance frequency of the element $fr_1$. In this respect, the element may comprise a dynamic strain gauge or any other system for determining the vibration frequency connected to a data processing system that will analyse the adapt the position of the mass as a function of the absolute value of the difference between a first vibration frequency $f_1$ of said element and the resonance frequency $fr_1$ corresponding to the first natural frequency of said element in order to check that the behaviour of the element is consistent with that which is expected.

Consequently, the method for shifting the center of gravity of the element comprises the stages involving:
a) determining a first frequency $f_1$ corresponding to the vibration frequency of said element;
b) determining a second frequency $fr_1$ corresponding to the first natural frequency of said element;
c) calculating the absolute value $|f_1-fr_1|$;
d) performing a comparison of $|f_1-fr_1|$ in relation to a first threshold consisting of establishing a risk of resonance if the absolute value of said difference is less than or equal to the first threshold;
e) if a risk of resonance has been determined at the previous stage, shifting the center of gravity of the element along its direction of elongation in order to reduce the natural frequency of the element when $f_1>fr_1$ or increase the natural frequency of the element when $f_1<fr_1$.

During operation, the element will vibrate at a frequency $f_1$ following mainly the frequential excitation f derived from rotation of the blades, without however excluding other sources of vibrations. When the frequencies $f_1$ and $fr_1$ are not sufficiently wide apart, two cases may arise:
$f_1>fr_1$ corresponding to a situation in which the vibration frequency $f_1$ of the element is greater than the natural frequency $fr_1$
$f_1<fr_1$ corresponding to a situation in which the vibration frequency $f_1$ of the element is greater than the natural frequency $fr_1$.

In practice, the difference $|f_1-fr_1|$ should be at least equal to 10% of the value of $fr_1$ and in absolute terms should not be less than 5% of $fr_1$. The method of movement of the center of gravity of the element 58, 94 makes it possible to safeguard the vibratory dynamics of the element by rendering the center of gravity position dependent on the difference $|f_1-fr_1|$ and by maintaining the frequency $f_1$ at a maximum of 95% of $fr_1$ or a minimum of 105% of $fr_1$, hence excluding the interval [0.95 $fr_1$; 1.05 $fr_1$] and preferably the interval [0.9 $fr_1$; 1.1 $fr_1$].

Consequently, $fr_1$ needs to be moved apart from $f_1$, avoiding equality between these two values. This is achieved through a reduction in $fr_1$ when $f_1$ is higher and an increase in $fr_1$ when $f_1$ is lower.

Concretely, the reduction in $fr_1$ is obtained by shifting the mass 86, 96 towards the end that is not rigidly fixed and the increase in $fr_1$ is obtained by shifting the mass towards the rigidly fixed end.

Such a method makes it possible to control the natural frequencies $fr_1$ of the element taking account of the excitation frequency $f_1$ induced by operation of the turbine engine.

The invention claimed is:

1. An annular air flow passage comprising two radially internal and external annular walls, wherein an element is elongated in a direction between the internal and external annular walls and a first of the internal or external ends of the element is fixed rigidly to a first of the internal or external walls, wherein said annular flow passage comprises means of control of means of variation, along said direction, of the position of the element's center of gravity, wherein the means of variation of the center of gravity position comprise means of movement of a mass along said direction of elongation, wherein the means of movement comprise a rod mounted movably in translation, according to the direction of elongation, in a cavity of the element, wherein this rod bears the mass, and wherein a first end of the ends of the rod passes through said first wall and is connected to means of measurement of the position of the mass along the element elongated in the cavity.

2. The annular airflow passage of claim 1, wherein said mass is arranged on a second end of the rod opposite the first end.

3. The annular airflow passage of claim 1, wherein the rod comprises weights spaced along the rod.

4. The annular airflow passage of claim 3, wherein the second end of the element elongated opposite said first end is free.

5. A turbine engine comprising the annular air flow passage of claim 1 and an annular row of mobile blades driven in rotation by a rotor, wherein said row is arranged in the flow passage upstream from said elongated element.

6. A method for shifting the center of gravity of the element of the annular flow passage of claim 1, comprising the steps of:

determining a first frequency $f_1$ corresponding to the vibration frequency of said element;

b) determining a second frequency $fr_1$ corresponding to the first natural frequency of said element;

c) calculating the absolute value $|f_1-fr_1|$;

d) performing a comparison of $|f_1-fr_1|$ in relation to a first threshold consisting of establishing a risk of resonance if the absolute value of said difference is less than or equal to the first threshold;

e) if a risk of resonance has been determined at the previous stage, shifting the center of gravity of the element along its direction of elongation in order to reduce the natural frequency of the element when $f_1>fr_1$ or increase the natural frequency of the element when $f_1<fr_1$.

* * * * *